United States Patent Office

2,874,137
Patented Feb. 17, 1959

2,874,137
WAX EMULSION POLISH CONTAINING OXIDIZED POLYETHYLENE WAX

John Pisanchyn and Harvey A. Troutman, Morristown, N. J., assignors to Allied Chemical Corporation, a corporation of New York No Drawing. Application April 30, 1956
Serial No. 581,340

5 Claims. (Cl. 260—29.6)

This invention relates to wax emulsion polishes. It relates more particularly to wax emulsion polishes of the "dry-bright" type, that is in which a wax is dispersed in an aqueous medium from which it is deposited upon application of the polish and drying to leave a dry surface having a bright luster.

The primary object of the present invention is to provide such a wax emulsion polish in which the wax component is an emulsifiable oxidized polyethylene wax.

A further object of the present invention is to provide a wax emulsion polish composition containing an emulsifiable oxidized polyethylene wax in combination with such other components that, upon application of the polish, a coating is deposited which spreads evenly, levels well, and has high gloss on drying.

Another object of the present invention is to provide a wax emulsion polish composition, and especially one for application to floors, containing an emulsifiable oxidized polyethylene wax in combination with such other components that, upon application of the polish, a coating is deposited which spreads evenly, levels well, dries readily, has high gloss, has high resistance to water spotting and to wear, and which is readily removable when desired.

An additional object of the present invention is to provide a dry-bright wax emulsion polish composition containing an emulsifiable oxidized polyethylene wax in combination with other components of such nature that the proportions of the emulsifiable oxidized polyethlene wax and the other components relative to each other can be varied over a wide range without adversely affecting the leveling and spreading properties and the gloss of the coating produced when the composition is applied.

Other objects will in part be obvious and will in part appear hereinafter.

As employed herein, the term "emulsifiable oxidized polyethylene wax" refers to an oxidized polyethylene wax which will form a stable aqueous emulsion meeting at least the "good" standard below when subjected to the following test, employing the standard test formulation given below.

| | Grams |
|---|---|
| Oxidized polyethylene wax | 30 |
| Oleic acid | 6 |
| Morpholine | 6 |
| Water | 138 |

The wax to be tested is melted, with care not to exceed a temperature of about 125° C., and the oleic acid is added. With the melt temperature at 120°–130° C., morpholine is added slowly. The water is heated to 95°–99° C. (just below boiling) in a 400 cc. beaker fitted with a 3 bladed, 2 inch diameter propeller type agitator (Arthur H. Thomas catalog No. 92-40K), operated by a ⅟₁₀ horsepower motor. With the agitator rotating at about 800 R. P. M., the hot melt, at 115–125° C., is added gradually to the hot water during a period of about 2 minutes, in such a manner that the melt stream enters the water at the top of the vortex caused by the stirring action, spiralling down the vortex and being emulsified en route without accumulation in the vortex. When all the melt has been added to the water, stirring is reduced to about 400 R. P. M., the beaker is covered and its contents allowed to cool to 40°–50° C. The emulsion is then weighed, and any weight loss, due to evaporation of water, is compensated by addition of water to restore original weight. The ease of emulsification of the wax is evaluated by the appearance and stability of the resulting emulsion, rated as follows:

| Appearance | Rating ease of emulsification |
|---|---|
| Clear to translucent—stable | Excellent. |
| Translucent—stable | Very good. |
| Milky—fine particles—stable | Good. |
| Milky—coarse particles—stable | Fair. |
| Milky—separates on standing | Poor. |

Polyethylene waxes are known compositions. They are normally solid, hard, waxy compounds having molecular weights in the range between about 1,000 and about 5,000, and especially between 1,000 and 3,000; having initial hardness characteristics exhibiting penetrations not more than about 0.7 mm. as measured by the standard ASTM penetration test, D-5-25; usually having viscosity characteristics, as measured by the standard Saybolt Furol test at 140° C. (ASTM-88-44), between about 10 and about 1,000 seconds; and having melting points between about 160° F. and about 240° F.

"Hard" waxes, as this term is used in the trade, are those waxes having penetration values of not more than about 1.5 millimeters, when tested according to the above standard ASTM penetration test (D-5-25). In this test, a standard needle under a 100 gram load is brought to bear for a period of 5 seconds upon the surface of the wax, held at 77° F. The harder the wax, the less the degree of penetration of the needle.

In addition to their high molecular weight and superior hardness characteristics, the polyethylene waxes as above defined are characterized by a high degree of toughness, i. e., resistance to fracture upon submission to pressure or impact, in contradistinction to the excessive brittleness of most of the commonly available hard waxes. This characteristic of toughness, which renders these waxes extremely valuable in coatings such as floor coatings, may be measured by application of the standard Izod impact test (ASTMD-256-47T) in which one end of a wax specimen, cast in the form of a bar ¼ inch by ½ inch by 3 inches, is secured in the machine and the other end is subjected to the impact of a weighted arm. The weight necessary to break the bar is reported as impact strength or toughness, in foot pounds per linear inch. When subjected to this test, the hard polyethylene waxes, as defined, may have initial toughness characteristics in the neighborhood, for example of from about 2.0 to about 5.0, as compared to values of around 0.3 to 0.4 for commercially available hard waxes such as carnauba wax, the hard microscrytalline waxes and the Fischer-Tropsch waxes.

The polyethylene waxes are essentially polymethylenic compounds such as polymerized ethylene, either in strictly hydrocarbon form or in the form of a "telomer," i. e., a polyethylene wax having a terminal residue on the polyethylene chain, resulting from polymerization of ethylene in the presence of a co-reactant. When ethylene is polymerized in the presence of a co-reactant, for example, as disclosed in U. S. Patents 2,504,400 and 2,683,141 of Michael Erchak, Jr., a "telomer" is formed having a structure which is essentially polyethylenic and containing, as a terminal addition to its polyethylene chain, a radical of the co-reactant. Such polyethylene waxes, containing an alcohol group in their structure, will be referred to herein as polyethylene/alcohol telomers and by this term is meant waxes prepared by polymerizing ethylene under wax-forming conditions in the presence of a liquid aliphatic alcohol having from 1 to 10 carbon atoms, inclusive.

While the polyethylene waxes, as above defined have waxy properties and superior toughness, they are not normally suitable for use in wax emulsion polishes because of their failure to form stable aqueous emulsions; when subjected to the above emulsification test they produce emulsions falling in the "poor" classification, if at all.

Oxidized polyethylene waxes have been developed which possess the ability to form good to excellent emulsions when tested by the above test, and which have most of the other above properties of the non-emulsifiable polyethylene waxes to substantially the same degree. Commercially available products of this type are sold under such names as "A-C Polyethylene 629," "A-C Polyethylene 729," "A-C Polyethylene 630," and "Epolene E."

In general, they comprise mildy oxidized polyethylene waxes in which oxygen has been introduced into the molecule, presumably in the form of carboxyl groups, without materially altering the molecule in other respects. They are generally characterized by an essentially polyethylenic structure formed of recurring —$CH_2$— groups, by a molecular weight between about 1,000 and about 5,000 (and preferably an average molecular weight between 1,000 and 3,000), by an oxygen content between about 1% and about 17% (preferably between about 1% and about 7%), by a hardness equal to a penetration not more than 1.5 mm. (preferably not more than 0.5 mm.) as measured by standard ASTM method D-5-25, by a toughness equal to at least 2 foot pounds per linear inch as measured by standard ASTM method D-256-47T, and by a low ratio of saponification number to acid number (preferably between 1 and about 1.2).

One method of making such emulsifiable oxidized waxes, disclosed in application Serial No. 515,770 of Michael Erchak, Jr., filed June 15, 1955, involves subjecting non-emulsifiable polyethylene waxes of the type described above, in the liquid phase, to the action of an oxygen-containing gas under such conditions of temperature, pressure and quantity of oxygen as to produce the reaction of between about ½ pound and about 7 pounds of oxygen per 100 pounds of polyethylene wax per hour.

The rate of oxidation is determined largely by conditions of temperature, pressure and flow of oxygen-containing gas. When these are so correlated that the rate of oxygen absorption by the wax is at least about ½ pound of oxygen per 100 pounds of wax per hour, and not more than about 5 pounds of oxygen per 100 pounds of wax per hour, satisfactory enhancement of the emulsifiability of the waxes can be obtained by the reaction of a total of between about 1 and about 7 pounds of oxygen per 100 pounds of wax in limited times, ranging from about 1 hour to about 8 hours without substantial degradation or cleavage of the wax molecule, and with a minimum diminution in the hardness and toughness of the treated wax, producing a hard, tough, emulsifiable wax.

Suitable oxidation temperatures range between about 135° C. and about 175° C.; and oxygen partial pressures range between ⅓ and about 200 pounds per square inch. Preferably, air at pressures between about 200 and about 800 p. s. i. g. is used.

When the hard polyethylene waxes are oxidized according to said process, such waxes are rendered readily emulsifiable with a decrease in hardness amounting to not more than about 0.3 mm. in the above hardness scale, usually with decrease in hardness ranging from none to about 0.2 mm. If oxidation is continued far beyond the point at which good emulsifiability is achieved, a somewhat further softening of the wax takes place. In general, it is preferred not to carry the oxidation beyond the point at which the penetration reaches 1.5 mm. as measured by the above test. For use in accordance with the present invention, emulsifiable oxidized polyethylene waxes having penetrations of not more than about 0.5 mm. are preferred.

Another method of making emulsifiable oxidized waxes of the type described above, which method is disclosed in application Serial No. 524,620 of Wilbur F. Chapman and John N. Cosby, filed July 26, 1955, involves subjecting the non-emulsifiable polyethylene wax to a modification of the above Erchak process in which the polyethylene wax, in the liquid phase, is subjected to the oxidation treatment after addition thereto of a small quantity of an unsaturated aliphatic polycarboxylic acid having from 4 to 6 carbon atoms and having at least 1 carbonyl group attached to a doubly bound carbon atom. Preferred unsaturated acids are maleic acid or anhydride and fumaric acid. Other acids which may be used include mesaconic, citraconic, glutaconic, itaconic, muconic and aconitic acids and also the anhydrides of such of the above acids as form anhydrides. The quantity of unsaturated acid used is not unduly critical; small quantities within the range between about 1% and about 3%, based on the weight of the wax oxidized, are usually sufficient.

As a result of such modification, not only is good emulsifiability obtained in relatively much shorter periods, and with consumption of significantly smaller amounts of oxygen than when oxidation is carried out in the absence of the unsaturated acid, but the resulting oxidized wax products have superior hardness characteristics, often being harder than the starting wax materials, and have enhanced toughness characteristics as reflected in a substantial increase in viscosity.

In order to meet acceptable standards, dry-bright floor polishes, that is, polishes which can be applied directly in the aqueous emulsion form and which dry readily to make a wax coating that has a high gloss without buffing, should preferably possess the following properties at least to the extent classified as "good" on the scale Excellent
Good
Fair
Poor when tested by standard tests for such properties.

SPREADING

This refers to ease of surface wetting and flow-out of the emulsion. It is determined by permitting a standard quantity of the emulsion to flow onto a standard rubber test tile.

LEVELING

This refers to uniformity of film thickness and drying of a standard sample of the emulsion on a standard rubber test tile. There should be no tendency to pull up in ridges or form puddles.

GLOSS

This refers to the visual gloss or luster of the dried emulsion on a standard rubber test tile when viewed under standard conditions. It is a measure of the fineness of dispersion of the wax particles in the emulsion and is also dependent upon the degree of leveling.

WATER-SPOT RESISTANCE

This refers to the ability of the dry emulsion coating on a standard rubber test tile to withstand watermarking.

WET-TRAFFIC RESISTANCE

This refers to the ability of the dry wax coating on a standard rubber test tile to withstand the scrubbing action of distilled water in a Gardner washability machine for a standard period.

REMOVABILITY

This refers to the ease with which the dry wax coating can be removed from a standard rubber test tile as determined by subjecting it to the washing action of water or water and soap in a Gardner washability machine for a standard number of cycles.

We have discovered that superior aqueous wax emulsion polishes of the dry-bright type having an oxidized polyethylene wax as the wax constituent can be obtained by incorporating with an aqueous dispersion of an emulsifiable oxidized polyethylene wax of the above type, an aqueous dispersion of a polystyrene resin having a molecular weight above 5000, and an aqueous alkaline solution of an alkali-soluble material of the type and in the proportions set out more fully below.

Thus, we have discovered that aqueous dispersions containing 8 to 20 parts total solids per 100 parts by weight of dispersion, said total solids comprising essentially 1.6 to 11 parts by weight of oxidized polyethylene wax, 1.6 to 11 parts by weight of polystyrene resin, and 1.6 to 9 parts by weight of the alkali-soluble material, constitute superior emulsion wax polishes of the dry-bright type. They have good to excellent spreading, leveling, gloss, water-spot resistance, water traffic resistance, and removability. An outstanding advantage is the resistance of the polished surface to scuffing and the ease with which gloss can be restored by buffing. The toughness and flexibility of the oxidized polyethylene wax component of the formulation reduce the tendency to brittleness and cracking which is a characteristic of ordinary high resin type polishes. The high molecular weight and low polarity of the oxidized polyethylene wax contribute to the water resistance, wet-scuff, adhesion and buffability properties of the film on the floor surface.

This result is surprising in view of the fact that, from such properties of oxidized polyethylene waxes as their relative tackiness (drag) and dirt pick-up as compared to carnauba and similar waxes, it was to have been expected that a wax emulsion composition containing oxidized polyethylene as the wax base component would not have the required polish properties, and in view of the fact that the addition of large quantities of resins to wax formulations generally leads to an increase in the brittleness and a decrease in polishability properties of the composition, it was to have been expected that the resulting emulsion would similarly be deficient in the ease of buffability and wear resistance. Due to their tackiness and their tendency to pick up dirt, it was to have been expected that the oxidized polyethylene waxes would not constitute good bases for floor wax composition in the absence of substantial proportions of carnauba or similar waxes.

Further, owing to their inferior gloss and hardness as compared to such waxes as carnauba and similar animal and vegetable waxes, it was to have been expected that the oxidized polyethylene waxes would not have sufficient luster and non-scuff properties to be suitable for use in aqueous emulsion wax polish formulations, especially of the dry-bright type.

In preparing emulsions of the present invention, each of the three basic components, oxidized polyethylene wax, polystyrene material, and alkali-soluble resin, is separately prepared in the form of an aqueous emulsion or solution and the emulsions and solution are then blended in proportions such as to provide concentrations of said three components in the final emulsion lying within the above ranges.

For simplicity of preparation, each of said three components is prepared in the form of an emulsion or solution containing 8% to 20%, preferably about 15%, by weight of solids. If desired, emulsions and solutions containing higher and lower concentrations of components can be employed. Thus, commercial polystyrene emulsions containing 36% or more solids can be used as such, and suitable adjustment can be made by the use of other components of lower concentration or by addition of water.

The preferred proportions of the above three basis components of the emulsions are 20% to 55% by weight of the wax emulsion containing 8% to 20% of oxidized polyethylene wax, 20% to 55% by weight of polystyrene emulsion containing 8% to 20% by weight of polystyrene, and 20% to 45% by weight of a solution of alkali-soluble resin containing 8% to 20% by weight of resin, all combined into a stable aqueous dispersion containing 8 to 20 parts total solids per 100 parts by weight of dispersion.

Preferred wax emulsion polishes comprise essentially 40 to 80 parts by volume of an 8% to 20% by weight, and especially about a 13% by weight, aqueous emulsion of emulsifiable oxidized polyethylene wax; 30 to 70 parts by volume of an 8% to 20% by weight, and especially about a 13% by weight, aqueous emulsion of a polystyrene resin having a molecular weight above 100,000 and preferably plasticized with small amounts of a phthalate ester plasticizer and an aliphatic phosphate plasticizer; and 30 to 60 parts by volume of an 8% to 20% by weight, and especially about a 15% by weight, solution in aqueous ammonium hydroxide of an alkali-soluble resin selected from the group consisting of rosin, shellac, casein, phenol-formaldehyde resins, condensation products of reactants comprising maleic anhydride and rosin and condensation products of reactants comprising fumaric acid and rosin, said emulsifiable oxidized polyethylene wax being a hard, waxy, essentially polyethylenic compound characterized by a recurring —$CH_2$— group and a content of between about 1% and about 7% of oxygen, and having an average molecular weight between about 1,000 and about 3,000, a penetration not more than about 0.5 mm. as measured by standard ASTM method D–5–25, a toughness of at least 2 foot pounds per linear inch as measured by standard ASTM method D–256–47T, and a ratio of saponification number to acid number of 1 to about 1.2, preferably emulsified by morpholine oleate.

Polishing compositions of outstanding properties contain the components in the preferred ranges of proportions set out above. Beyond said ranges, compositions varying from said preferred ranges are also valuable polishes but they vary with respect to one or more properties depending upon the component varied. Thus, increasing the amount of oxidized polyethylene wax increases the buffability, non-slip and flexibility of the composition but also increases its tendency to pick up dirt and become tacky.

Increasing the proportion of polystyrene resin increases the hardness of the resulting coating but decreases the spreading and leveling properties. On the other hand, when the amount of polystyrene resin is substantially decreased, the coating becomes brittle and less wear resistant.

Substantial increase of the alkali-soluble material tends to render the resulting emulsion less stable and causes the coating to become brittle and less wear resistant. On the other hand, greatly decreased amounts of the alkali-soluble material lead to poor spreading and leveling and softer wax coatings.

Any emulsifiable oxidized polyethylene wax having a molecular weight of 1,000 to 5,000, preferably 1,000 to 3,000, and preferably having an average molecular weight of 1,200 to 1,800, a hardness equal to a penetration of 0.15 mm. to 0.35 mm., and preferably of 0.2 mm. to 0.3 mm., and a toughness equal to at least 2 foot pounds per square inch, as measured by the above standard tests, may be used as the wax component in preparing the emulsion compositions of the present invention. Preferably the oxidized polyethylene waxes referred to above are employed.

For preparation of the wax component emulsion, the oxidized polyethylene wax is emulsified with a suitable emulsifying agent, preferably in the manner set out above in connection with the emulsification test. Preferably the minimum amount of emulsifying agent required to produce a highly dispersed, stable emulsion is employed. Various emulsifying agents normally used for the preparation of wax emulsions can be used, including, for example, oleic acid, linoleic acid, mixtures thereof, stearic acid, palmitic acid and the like higher fatty acids, in combination with suitable alkali, preferably ammonia or an organic base such as morpholine, aminomethylpropanol, mono-, di-, or triethanolamine, and the like. If desired a part of the organic base can be replaced by borax or other alkali, as is customary in the preparation of wax emulsions. Thus, 20 to 60 parts by weight of emulsifiable oxidized polyethylene wax may be emulsified with 1 to 15 parts, preferably 3 to 9 parts, by weight of oleic acid and 2 to 16 parts, preferably 3½ to 10½ parts, by weight of morpholine, and sufficient water to bring the total solids to 8% to 20%. As pointed out above, higher proportions of wax can be used, with suitable adjustment of the other components and/or the final emulsion. Thus the wax emulsions may contain 35% or more of the oxidized polyethylene wax.

As polystyrene resin component, various emulsions of high molecular weight polystyrene resins (those having a molecular weight above 5,000) and preferably those having a molecular weight above 100,000 may be employed. Those which are aqueous emulsions formed in the preparation of the polystyrene resin and which come into the market in highly dispersed emulsion form (latices) are preferred.

While the oxidized polyethylene wax exerts a plasticizing effect on the polystyrene resin, we prefer, in order to impart superior leveling and other desirable properties to the final emulsion composition, to incorporate a small amount of an additional plasticizer with the polystyrene emulsion; as, for example, an organic plasticizer such as a phthalate plasticizer (e. g., dibutyl phthalate), or an aliphatic phosphate plasticizer (e. g., tributyl phosphate or tributoxy ethyl phosphate). Preferably a small amount of a mixture of a phthalate ester plasticizer and an aliphatic phosphate plasticizer is employed, and particularly dibutyl phthalate and tributoxy ethyl phosphate.

In preparing the polystyrene resin emulsion component, the small amounts of plasticizer are mixed with the polystyrene resin, preferably as obtained in aqueous emulsion form, and then sufficient water is added to dilute the mixture to the desired solids concentration.

Various synthetic and natural, alkali-soluble resins and casein may be employed as the third component (the alkali-soluble material) of the composition; for example, rosin, shellac, casein, phenolformaldehyde resins, condensation products of reactants comprising maleic anhydride and rosin and/or polyhydric compounds, or condensation products of reactants comprising fumaric acid and rosin and/or polyhydric compounds. Preferably, the alkali-soluble material is a synthetic resin of the phenol-formaldehyde type.

In preparing the solution of the alkali-soluble material, the said material is preferably dissolved by gentle heating in an aqueous solution of a suitable alkali. In general, ammonium hydroxide is preferred, since it is readily volatilized from the finished composition. It may be replaced, however, in part or in whole, by other alkalis; as, for example, borax or one of the above organic bases.

The three components in the emulsion or solution form can be blended in any order in the proportions adapted to provide the proportions of components set out herein.

It is a feature of the present invention that the relative proportions of the three components can be varied widely without adversely affecting the desired polishing properties of the final composition, as shown by the specific examples below. This also constitutes an unexpected feature of the present invention, since heretofore substantial variation in the proportions of modifiers incorporated into such compositions as carnauba wax emulsions have had a deleterious effect upon one or more of the desired polishing properties of the emulsions.

The invention will be illustrated by the following specific examples, but it is to be understood that the invention is not limited to their details and that changes may be made without departing from its scope. The temperatures are in degrees centigrade unless otherwise stated, and the parts and percentages are by weight unless designated as parts by volume. Where parts are by volume, the amount signifies the volume occupied by the same number of parts by weight of water at 4° C.

*Example 1*

*Oxidized polyethylene emulsion.*—40 parts of an emulsifiable oxidized polyethylene wax having a melting point of 210°–214° (procedure of ASTM D-87-42), a penetration (100 grams, 5 seconds, 77° F.) of 0.15–0.2 mm., an acid number of 10–13, and a saponification number of 10–13, having a molecular weight of 1,000 to 3,000, and an average molecular weight of 1,600 ("A–C Polyethylene 729"), are emulsified with 6 parts of oleic acid, 7 parts of morpholine and 254 parts of water by the above test procedure. The resulting emulsion contains the above components in the following proportions:

| | Parts |
|---|---|
| Oxidized polyethylene wax | 13.0 |
| Oleic acid | 2.0 |
| Morpholine | 2.3 |
| Water | 82.7 |
| | 100.0 |

*Polystyrene emulsion.*—100 parts of a commercial polystyrene latex in which the polystyrene has a molecular weight of about 150,000 and containing 36% total solids ("Ubatol 2001") are mixed at room temperature with 2.5 parts of dibutyl phthalate and 2 parts of tributoxy ethyl phosphate. After stirring for about ½ hour to insure thorough mixing, 165 parts of water are added with stirring. The resulting emulsion contains the components in the following proportions:

| | Parts |
|---|---|
| Polystyrene emulsion (36% solids) (13.4 dry) | 37.1 |
| Dibutyl phthalate | 0.9 |
| Tributoxy ethyl phosphate | 0.7 |
| Water | 61.3 |
| | 100.0 |

*Alkali-soluble resin solution.*—30 parts of a synthetic alkali soluble phenol-formaldehyde coating resin having an acid number of 130±7 ("Durez 15546 Resin") are dissolved in aqueous ammonium hydroxide by heating 165 parts of water to 85°, adding 2.5 parts of 28% ammonium hydroxide, then adding the resin with good agitation while maintaining the temperature at 85°–88°. A further 2.5 parts of 28% ammonium hydroxide are then added and the mixture is stirred until the resin has dissolved. The resulting solution contains

| | Parts |
|---|---|
| Resin | 15.0 |
| 28% ammonium hydroxide | 2.5 |
| Water | 82.5 |
| | 100.0 |

Equal proportions by volume of the resulting oxidized polyethylene wax emulsion, polystyrene resin emulsion, and alkali-soluble resin solution are mixed together in that order. A highly superior emulsion floor-finishing composition of the "dry-bright" type is obtained which when tested by standard tests has "excellent" ratings with respect to all of the following properties: spreading, leveling, visual gloss, water spot resistance, wet-traffic resistance, and removability.

Examples 2-11

These examples illustrate the flexibility of the composition of the present invention. In each case, the oxidized polyethylene wax emulsion, polystyrene resin emulsion, and alkali-soluble resin solution, as prepared in Example 1, were mixed in that order in the proportions by volume set out in the following table. The properties of the resulting emulsions when subjected to standard tests for such properties were as set out in the table, wherein the ratings are according to the following scale:

1. Excellent
2. Good
3. Fair
4. Poor

TABLE

| Example No. | Proportions | Spreading | Leveling | Visual gloss | Water spot resist. | Wet-traffic resist. | Removability |
|---|---|---|---|---|---|---|---|
| 2 | 40:70:40 | 1 | 1 | 1 | 1 | 1 | 1 |
| 3 | 50:60:40 | 1 | 1 | 1 | 1 | 1 | 1 |
| 4 | 50:40:60 | 1 | 1 | 1 | 1 | 1 | 1 |
| 5 | 40:60:50 | 1 | 1 | 1 | 1 | 1 | 1 |
| 6 | 60:60:30 | 1 | 1 | 1 | 1 | 1 | 1 |
| 7 | 60:45:45 | 1 | 1 | 1 | 1 | 1 | 1 |
| 8 | 60:30:60 | 1 | 2 | 1 | 1 | 1 | 1 |
| 9 | 70:40:40 | 1 | 1 | 1 | 1 | 1 | 1 |
| 10 | 70:50:30 | 1 | 2 | 1 | 1 | 1 | 1 |
| 11 | 80:30:40 | 1 | 2 | 1 | 1 | 1 | 1 |

It will be realized that the invention is not limited to the details of the above examples, but that various changes may be made in the materials employed, method of procedure, reagents employed, and other conditions without departing from the scope of the appended patent claims.

Thus, as pointed out above, the proportions of materials employed in making the individual emulsions or solution, the manner of their preparation, the order of mixing, and the proportions in which they are mixed can be varied.

If desired, a part of the oxidized polyethylene wax may be replaced by any of the usual waxes employed in floor polish formulations. Thus, a small part of the oxidized polyethylene wax may be replaced by carnauba wax.

We claim:

1. A wax polish in the form of a stable aqueous dispersion containing 8 to 20 parts total solids per 100 parts by weight of dispersion, said total solids comprising essentially 1.6 to 11.0 parts by weight of an emulsifiable oxidized polyethylene wax having a molecular weight of about 1,000 to about 5,000, an oxygen content between about 1% and 17%, a hardness equal to a penetration not more than 1.5 mm. as measured by standard ASTM method D-5-25, a toughness equal to at least 2 foot pounds per linear inch as measured by standard ASTM method D-256-47T, and a low ratio of saponification number to acid number; 1.6 to 11.0 parts by weight of a polystyrene resin having a molecular weight above 5,000; and 1.6 to 9.0 parts by weight of an alkali-soluble material selected from the group consisting of rosin, shellac, casein, phenol-formaldehyde resins, condensation products of reactants comprising maleic anhydride and rosin and condensation products of reactants comprising fumaric acid and rosin.

2. A wax polish as defined in claim 1 wherein the polystyrene resin has a molecular weight above 100,000.

3. A wax polish as defined in claim 1 wherein the emulsifiable oxidized polyethylene wax is an oxidized polyethylene wax having a molecular weight of about 1,000 to about 3,000, an oxygen content between about 1% and 7%, a hardness equal to a penetration not more than 1.5 mm. as measured by standard ASTM method D-5-25, a toughness equal to at least 2 foot pounds per linear inch as measured by standard ASTM method D-256-47T, and a ratio of saponification number to acid number of 1 to 1.2; the polystyrene resin has a molecular weight above 100,000; and the alkali-soluble material is a phenol-formaldehyde resin.

4. A wax polish in the form of a stable aqueous emulsion containing 8 to 20 parts total solids per 100 parts by weight of emulsion, said emulsion comprising essentially 40 to 80 parts by volume of an 8% to 20% by weight aqueous emulsion of an emulsifiable oxidized polyethylene wax, 30 to 70 parts by volume of an 8% to 20% by weight aqueous emulsion of a polystyrene resin having a molecular weight above 100,000, and 30 to 60 parts by volume of an 8% to 20% by weight solution in aqueous ammonium hydroxide of an alkali-soluble material selected from the group consisting of rosin, shellac, casein, phenol-formaldehyde resins, condensation products of reactants comprising maleic anhydride and rosin and condensation products of reactants comprising fumaric acid and rosin; said emulsifiable oxidized polyethylene wax being a hard, waxy, essentially polyethylenic compound characterized by a recurring —$CH_2$— group and a content of between about 1% and about 7% of oxygen, and having an average molecular weight between about 1,000 and about 3,000, a penetration not more than about 0.5 mm. as measured by standard ASTM method D-5-25, a toughness of at least 2 foot pounds per linear inch as measured by standard ASTM method D-256-47T, and a ratio of saponification number to acid number of 1 to about 1.2.

5. A wax polish in the form of a stable aqueous emulsion containing about 15 parts total solids per 100 parts by weight of emulsion, said emulsion comprising essentially 40 to 80 parts by volume of about a 13% by weight aqueous emulsion of an emulsifiable oxidized polyethylene wax emulsified by morpholine oleate, 30 to 70 parts by volume of about a 13% by weight aqueous emulsion of a polystyrene resin having a molecular weight above 100,000 plasticized with small amounts of a phthalate ester plasticizer and an aliphatic phosphate plasticizer, and 30 to 60 parts by volume of about a 15% by weight solution in aqueous ammonium hydroxide of an alkali-soluble material selected from the group consisting of rosin, shellac, casein, phenol-formaldehyde resins, condensation products of reactants comprising maleic anhydride and rosin and condensation products of reactants comprising fumaric acid and rosin; said emulsifiable oxidized polyethylene wax being a hard, waxy, essentially polyethylenic compound characterized by a recurring —$CH_2$— group and a content of between about 1% and about 7% of oxygen, and having an average molecular weight between about 1,000 and about 3,000, a penetration not more than about 0.5 mm. as measured by standard ASTM method D-5-25, toughness of at least 2 foot pounds per linear inch as measured by standard ASTM method D-256-47T, and a ratio of saponification number to acid number of 1 to about 1.2.

References Cited in the file of this patent

UNITED STATES PATENTS

| | | |
|---|---|---|
| 2,695,277 | Pabst et al. | Nov. 23, 1954 |
| 2,750,302 | Carmarda et al. | June 12, 1956 |

FOREIGN PATENTS

| | | |
|---|---|---|
| 581,279 | Great Britain | Oct. 7, 1946 |